United States Patent
Byun et al.

(10) Patent No.: US 10,863,574 B2
(45) Date of Patent: Dec. 8, 2020

(54) METHOD AND APPARATUS FOR ESTABLISHING BEARER

(71) Applicant: LG ELECTRONICS INC., Seoul (KR)

(72) Inventors: Daewook Byun, Seoul (KR); Jian Xu, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,981

(22) PCT Filed: Oct. 27, 2017

(86) PCT No.: PCT/KR2017/011969
§ 371 (c)(1),
(2) Date: Dec. 12, 2018

(87) PCT Pub. No.: WO2018/080218
PCT Pub. Date: May 3, 2018

(65) Prior Publication Data
US 2019/0150220 A1    May 16, 2019

Related U.S. Application Data

(60) Provisional application No. 62/543,871, filed on Aug. 10, 2017, provisional application No. 62/514,786, (Continued)

(51) Int. Cl.
*H04W 76/27* (2018.01)
*H04W 80/08* (2009.01)
(Continued)

(52) U.S. Cl.
CPC ........... *H04W 76/27* (2018.02); *H04W 68/02* (2013.01); *H04W 76/10* (2018.02); *H04W 76/11* (2018.02);
(Continued)

(58) Field of Classification Search
CPC ..... H04W 76/27; H04W 76/11; H04W 76/10; H04W 68/02; H04W 80/02; H04W 80/08; H04W 88/085
See application file for complete search history.

(56) References Cited

U.S. PATENT DOCUMENTS

2016/0174281 A1    6/2016    Wen et al.
2016/0227555 A1    8/2016    Haberland
(Continued)

FOREIGN PATENT DOCUMENTS

KR    20140099483 A    8/2014
KR    20140115028 A    9/2014
(Continued)

OTHER PUBLICATIONS

LG Electronics Inc., "Architectural and specification aspects for CU-DU split," R3-162205, 3GPP TSG-RAN WG3 Meeting #93bis, Sophia Antipolis, France, Oct. 10-14, 2016, 3 pages.
(Continued)

*Primary Examiner* — Duc C Ho
(74) *Attorney, Agent, or Firm* — Fish & Richardson P.C.

(57) ABSTRACT

Provided are method for a distributed unit (DU) of a base station establishing a bearer in a wireless communication system, and an apparatus for supporting the same. The method may comprise the steps of: receiving a first message including a signaling radio bearer (SRB) identity (ID) from a central unit (CU) of the base station; and establishing a SRB corresponding to the received SRB ID.

14 Claims, 17 Drawing Sheets

Related U.S. Application Data filed on Jun. 3, 2017, provisional application No. 62/413,446, filed on Oct. 27, 2016.

(51) Int. Cl.
  *H04W 68/02* (2009.01)
  *H04W 80/02* (2009.01)
  *H04W 76/11* (2018.01)
  *H04W 76/10* (2018.01)
  *H04W 88/08* (2009.01)

(52) U.S. Cl.
  CPC ........... *H04W 80/02* (2013.01); *H04W 80/08* (2013.01); *H04W 88/085* (2013.01)

(56) References Cited

U.S. PATENT DOCUMENTS

| | | |
|---|---|---|
| 2016/0278110 A1 | 9/2016 | Lee et al. |
| 2017/0208516 A1* | 7/2017 | Kubota ................. H04W 36/08 |
| 2017/0331670 A1* | 11/2017 | Parkvall ............... H04J 11/0056 |
| 2018/0049213 A1* | 2/2018 | Gholmieh ......... H04W 72/0486 |
| 2018/0091485 A1* | 3/2018 | Lee ..................... H04W 12/001 |
| 2019/0223251 A1* | 7/2019 | Jiang ........................ H04L 5/00 |
| 2019/0274183 A1* | 9/2019 | Pelletier ........... H04W 72/1263 |

FOREIGN PATENT DOCUMENTS

| | | |
|---|---|---|
| KR | 20150005458 A | 1/2015 |
| WO | WO2016053435 A | 4/2016 |

OTHER PUBLICATIONS

InterDigital Communications, "Control Plane and Connectivity Principles for NR," R2-165053, 3GPP TSG-RAN WG2 #95, Gothenburg, Sweden, Aug. 22-26, 2016, 5 pages.

Extended European Search Report in European Application No. 17864167.6, dated Jul. 25, 2019, 11 pages.

* cited by examiner

METHOD AND APPARATUS FOR ESTABLISHING BEARER

CROSS-REFERENCE TO RELATED APPLICATIONS

This application is a National Stage application under 35 U.S.C. § 371 of International Application No. PCT/KR2017/011969, filed on Oct. 27, 2017, which claims the benefit of U.S. Provisional Application No. 62/543,871, filed on Aug. 10, 2017, U.S. Provisional Application No. 62/514,786, filed on Jun. 3, 2017, and U.S. Provisional Application No. 62/413,446, filed on Oct. 27, 2016. The disclosures of the prior applications are incorporated by reference in their entirety.

BACKGROUND OF THE INVENTION

Field of the invention

The present invention relates to a wireless communication system, and more particularly, to a method for a distributed unit (DU) of a base station to establish bearer and an apparatus supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

SUMMARY OF THE INVENTION

When a base station supports a central unit (CU) and a distributed unit (DU), a radio resource control (RRC) related function shall be located in the CU. An RRC message created by an RRC layer located in the CU of the base station shall be transmitted to a user equipment (UE) via the DU. That is, the RRC message shall be transmitted to the DU through an interface between the CU and the DU, and cannot be transmitted directly from the CU to the UE. Therefore, there is a need to propose a method of transmitting the RRC message through the interface between the CU and the DU and the interface between the DU and the UE, and an apparatus supporting the method. In addition, since data provided by the CU or the UE shall be transmitted to the UE or the CU via the DU, there is a need to propose a method for transmitting data through each of the interface between the CU and the DU and the interface between the DU and the UE, and an apparatus supporting the method.

In one embodiment, there is provided a method of establishing a bearer by a DU of a base station in a wireless communication system. The method may include: receiving a first message including a signaling radio bearer (SRB) identity (ID) from a CU of the base station; and establishing an SRB related to the received SRB ID.

The SRB may be at least any one of SRB0, SRB1, SRB2, and SRB3. The SRB ID may indicate at least any one of the SRB0, the SRB1, the SRB2, and the SRB3.

The first message may include a bearer level QoS parameter, a radio link control (RLC) configuration, and a logical channel configuration which are used to establish the SRB.

The method may further include, after establishing the SRB, transmitting a second message indicating the establishment of the SRB to the CU of the base station. The second message may include an SRB ID related to the established SRB.

The first message may be received through a control plane interface between the CU of the base station and the DU of the base station. The control plane interface may be an F1-C interface.

The first message further may include a container which piggybacks a radio resource control (RRC) message.

The CU of the base station may include an RRC layer and a packet data convergence protocol (PDCP) layer, and the DU of the base station may include a radio link control (RLC) layer, a media access control (MAC) layer, a physical (PHY) layer, and a radio frequency (RF).

The first message may include a data radio bearer (DRB) ID. The method may further include establishing a DRB related to the DRB ID if the DRB ID is included in the first message.

The base station may be a 5G RAN, a gNB, or a new radio (NR) base station (BS).

In another embodiment, there is provided a DU of a base station for establishing a bearer in a wireless communication system. The DU of the base station may include: a memory; a transceiver, and a processor connecting the memory and the transceiver. The processor may be configured to: control the transceiver to receive a first message including an SRB identity ID from a CU of the base station; and establish an SRB related to the received SRB ID.

A radio resource control (RRC) message or data can be transmitted between a central unit (CU) and distributed unit (DU) of a base station and between the DU of the base station and a user equipment (UE).

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
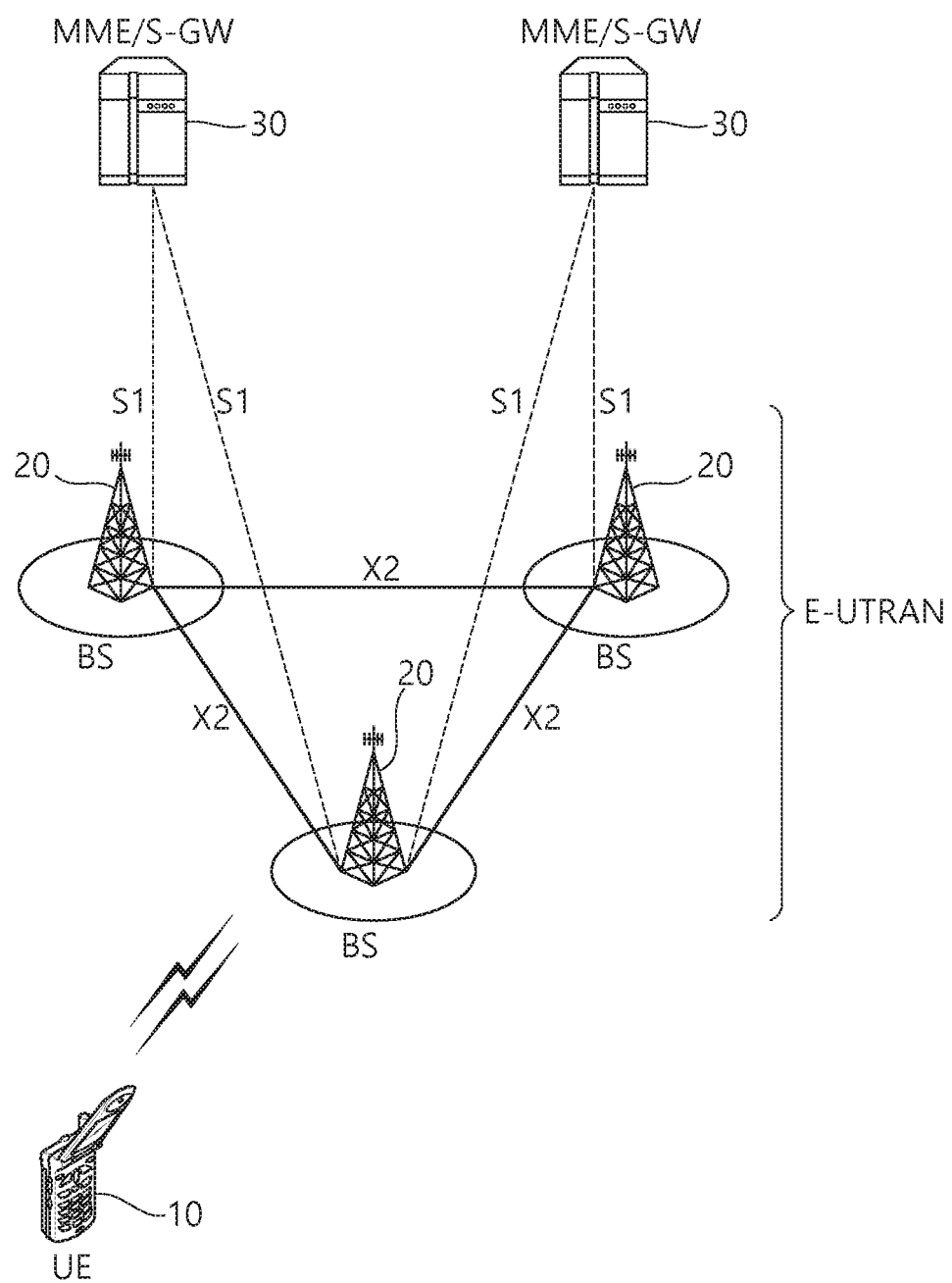
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
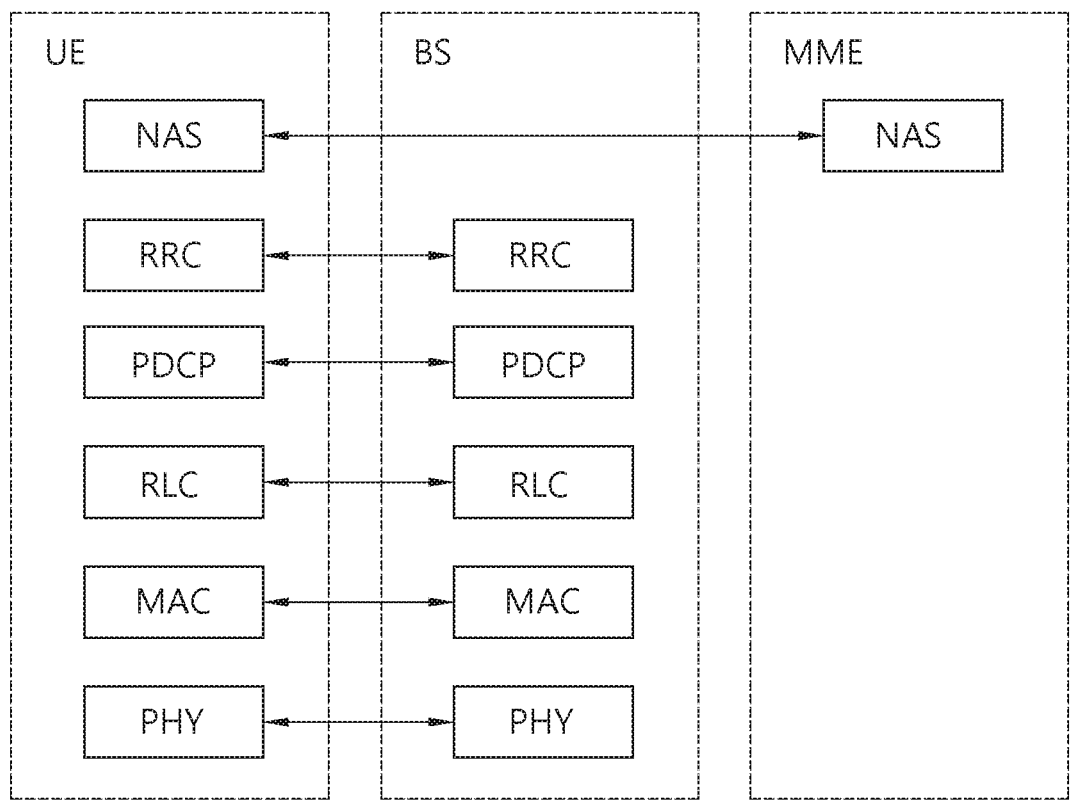
FIG. 2 shows a control plane of a radio interface protocol of an LTE system.
Figure 3:
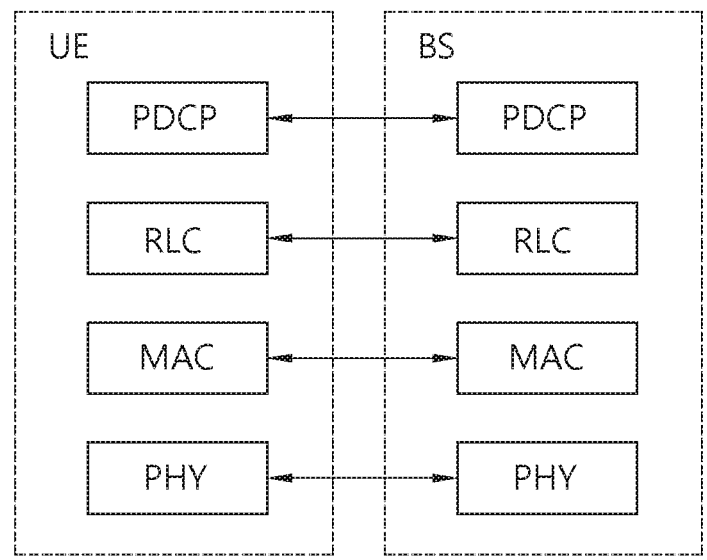
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network structure is described.

Figure 4:
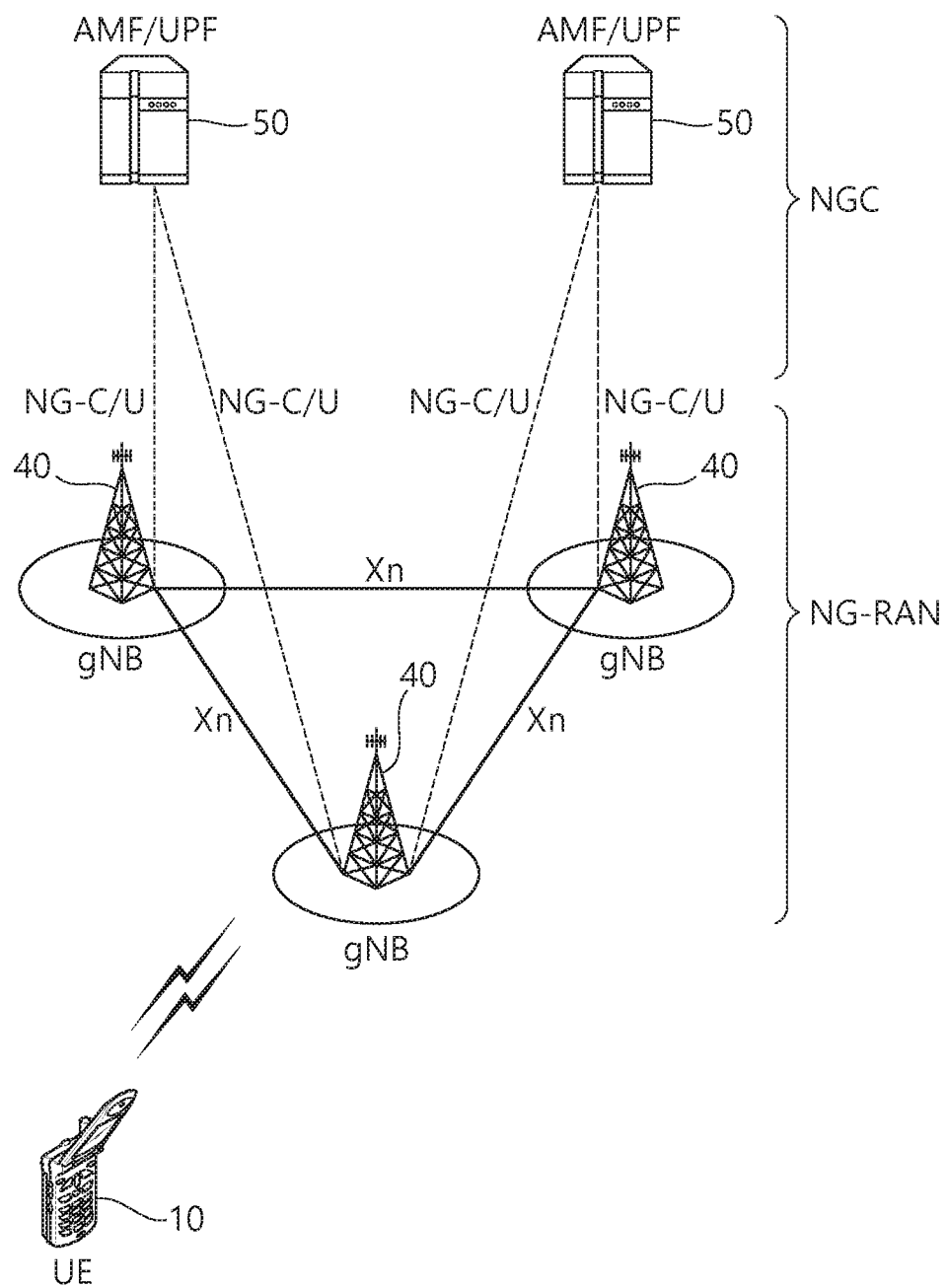
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, a 5G RAN deployment scenario will be described.

A 5G RAN may be classified into a 'non-centralized deployment' scenario, a 'co-sited deployment with E-UTRA' scenario, and a 'centralized deployment' scenario according to a shape of deploying a function of a base station in a central unit and a distributed unit and according to whether it coexists with a 4G base station. In this specification, the 5G RAN, a gNB, a next generation node B, a new RAN, and a new radio base station (NR BS) may imply a newly defined base station for 5G. In addition, a basic function to be supported by the 5G RAN may be defined by Table 1.

TABLE 1

| Function group similar to E-UTRAN | |
|---|---|
| Function similar to E-UTRAN | Synchronization, Paging, Connection, Handover, Load balancing, Radio access network sharing, etc. |
| First new RAN function group | |
| Support network Slicing | Capable of supporting core network slice of RAN |
| Tight Interworking | Dual connectivity, Data flow aggregation function between 4G and 5G eNBs |
| Multi-connectivity | Function of simultaneously connecting one New RAN node and multiple New RAN nodes through Data flow combination |
| Support multi-RAT handover | Handover function through new direct interface (xX) between eLTE eNB and gNB |
| Second new RAN function group | |
| UE Inactive mode | Function enabling direct connection when new traffic occurs in UE in a state where a radio access resource is released and a wired connection (gNB-NGC) is established |
| Direct service | D2D improvement function |
| Non-3GPP Interworking | Interworking function between Non-3GPP(e.g., WLAN) and NR |
| Support Inter-RAT handover through Core | Support handover between E-UTRA and NR through Core |

Figure 5:
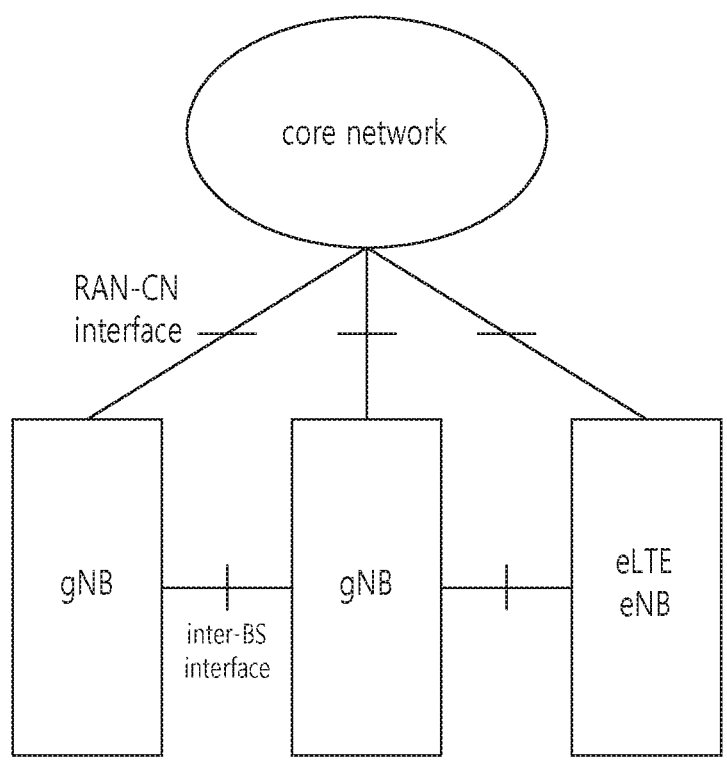
FIG. 5 shows a non-centralized deployment scenario.

FIG. 5 shows a non-centralized deployment scenario.

Referring to FIG. 5, a gNB may be configured in a horizontal manner without being split in a layered manner such as a CU and a DU. In this case, a protocol stack of a full set may be supported in each gNB. The non-centralized deployment scenario may be suitable for a macro cell or indoor hotspot environment. The gNB may be directly connected to another gNB or an eLTE eNB through an inter-BS interface. The gNB may be directly connected to a core network through an RAN-CN interface.

Figure 6:
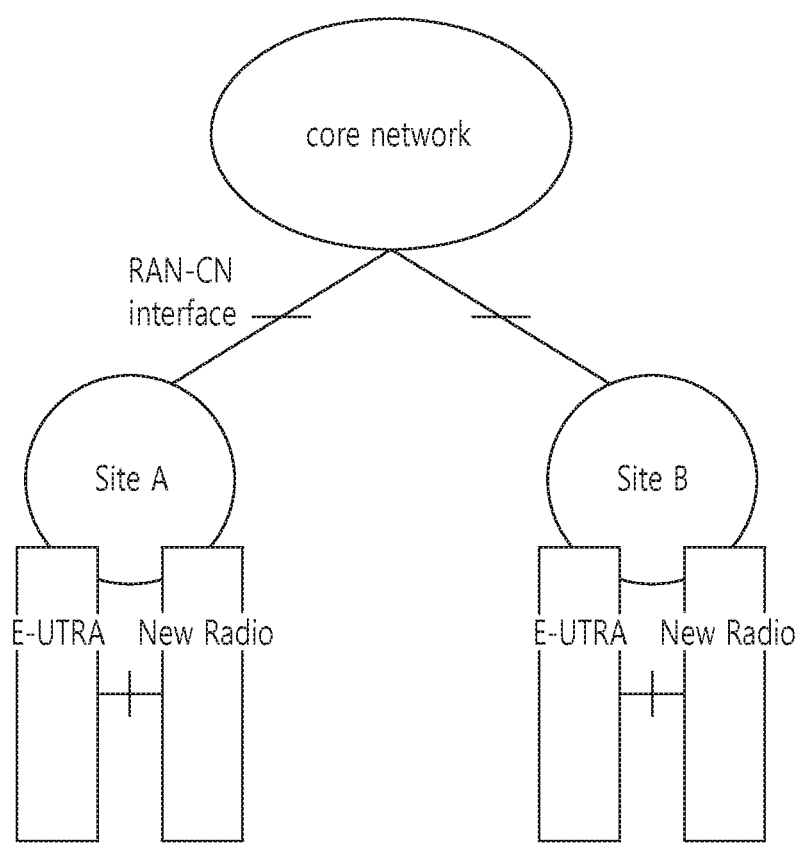
FIG. 6 shows a 'co-sited deployment with E-UTRA' scenario.

FIG. 6 shows a 'co-sited deployment with E-UTRA' scenario.

Referring to FIG. 6, a 5G transmission scheme (e.g., new radio) and a 4G transmission scheme (e.g., E-UTRAN) may be used together in one co-sited deployment. The co-sited deployment scenario may be suitable for an urban macro environment. When a gNB configuration is controlled by utilizing load balancing and multi-connectivity, the co-sited deployment scenario can utilize all frequency resources allocated to 4G/5G, and can extend cell coverage for a subscriber located at a cell boundary by using a low frequency.

Figure 7:
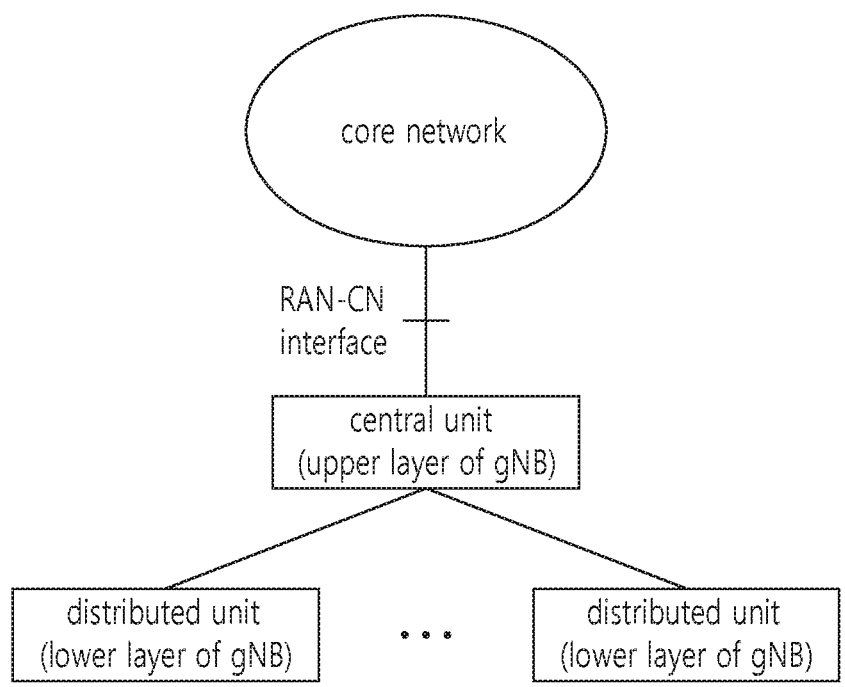
FIG. 7 shows a centralized deployment scenario.

FIG. 7 shows a centralized deployment scenario.

Referring to FIG. 7, a gNB may be split into a CU and a DU. That is, the gNB may operate by being split in a layered manner. The CU may perform a function of upper layers of the gNB, and the DU may perform a function of lower layers of the gNB. The centralized deployment scenario may be classified into a high performance transport type and a low performance transport type according to transmission capacity and delay characteristics of a transport device which connects the CU and the DU.

When the transport requires high performance, the CU accommodates many functions from the upper layer to the lower layer, whereas the DU accommodates only relatively a small number of lower layers in comparison with the CU. Therefore, processing of the CU may be overloaded, and it may be difficult to satisfy a requirement for transmission capacity, delay, and synchronization of the transport device. For example, when most of layers (RRC layers to physical layers) are deployed in the CU and only an RF function is deployed to the DU, it is estimated that a transmission band of the transport device is 157 Gbps and a maximum delay is 250 us, and thus the transport device requires an optical network with high capacity and low delay. On the other hand, since a transmission delay is short, when an optimal scheduling scheme is used, there is an advantage in that cooperative communication (e.g., CoMP) between gNBs can be more easily realized.

When the transport requires low performance, the CU accommodates an upper layer protocol function having a slightly low processing load, and thus there is room in the transmission capacity and delay of the transport device. For example, when only at least the upper layer (RRC layer) is deployed in the CU and all lower layers (PDCP layer to RF) lower than that are deployed in the DU, it is estimated that the transmission band of the transport device is 3 to 4 Gbps and the maximum delay is 10 ms. Therefore, there is room in the transmission band and the delay in comparison with the transport requiring high performance.

Figure 8:
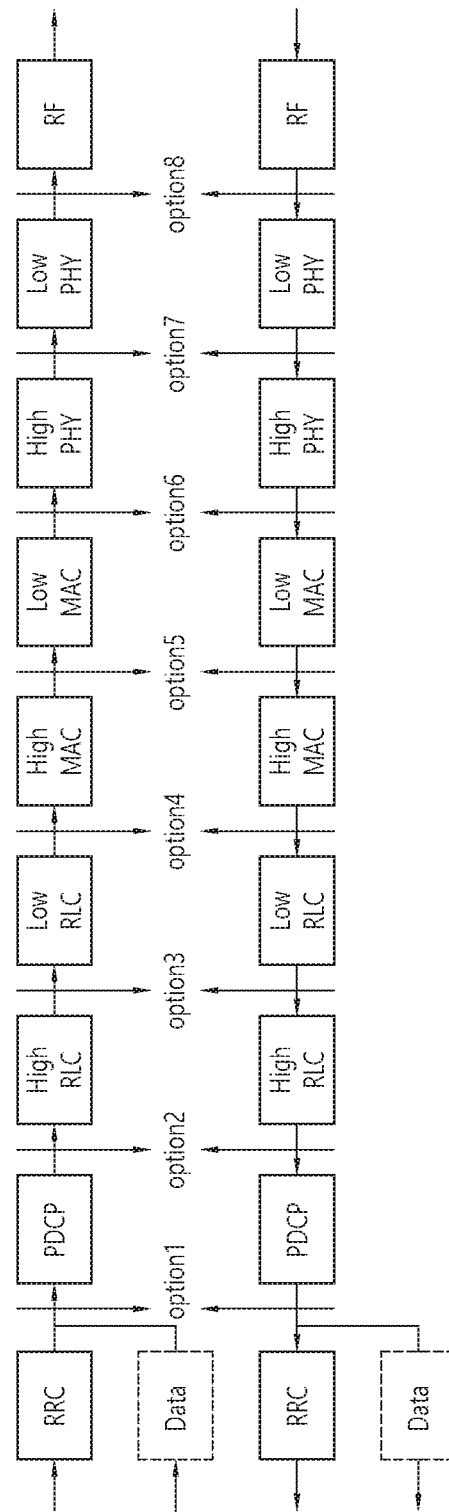
FIG. 8 shows a function split between a central unit and a distributed unit in a split-type gNB deployment scenario.

FIG. 8 shows a function split between a central unit and a distributed unit in a split-type gNB deployment scenario.

Referring to FIG. 8, in case of an option 1, an RRC layer is in a central unit, and an RLC layer, a MAC layer, a physical layer, and an RF are in a distributed unit. In case of an option 2, the RRC layer and the PDCP layer are in the central unit, and the RLC layer, the MAC layer, the physical layer, and the RF are in the distributed unit. In case of an option 3, the RRC layer, the PDCP layer, and an upper RLC layer are in the central unit, and a lower RLC layer, the MAC layer, the physical layer, and the RF are in the central unit. In case of an option 4, the RRC layer, the PDCP layer, and the RLC layer are in the central unit, and the MAC layer, the physical layer, and the RF are in the distributed unit. In case of an option 5, the RRC layer, the PDCP layer, the RLC layer, and an upper MAC layer are in the central unit, and a lower MAC layer, the physical layer, and the RF are in the distributed unit. In case of an option 6, the RRC layer, the PDCP layer, the RLC layer, and the MAC layer are in the central unit, and the physical layer and the RF are in the distributed unit. In case of an option 7, the RRC layer, the PDCP layer, the RLC layer, the MAC layer, and an upper physical layer are in the central unit, and a lower physical layer and the RF are in the distributed unit. In case of an option 8, the RRC layer, the PDCP layer, the RLC layer, the MAC layer, and the physical layer are in the central unit, and the RF is in the distributed unit.

Figure 9:
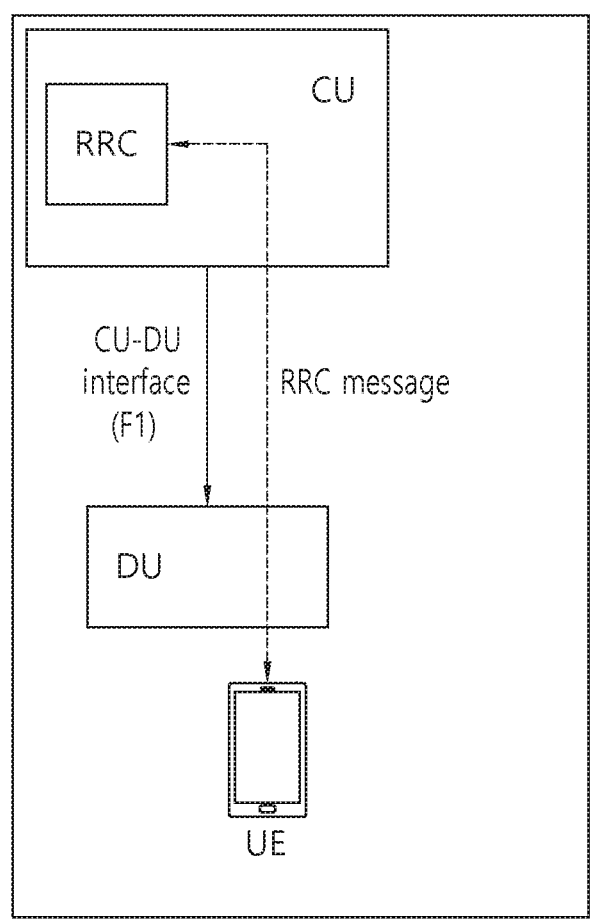
FIG. 9 shows an example of transmitting an RRC message through a distributed unit between a central unit and a UE.

FIG. 9 shows an example of transmitting an RRC message through a distributed unit between a central unit and a UE.

Meanwhile, when a base station supports a central unit and a distributed unit, an RRC related function may be located in the central unit. Referring to FIG. 9, an RRC message created by an RRC layer located in the central unit of the base station may be transmitted to a UE via the distributed unit. That is, the RRC message may be transmitted to the distributed unit through an interface between the central unit and the distributed unit, and cannot be transmitted directly from the central unit to the UE. Therefore, there is a need to propose a method of transmitting the RRC message through the interface between the central unit and the distributed unit and the interface between the distributed unit and the UE, and an apparatus supporting the method. Further, since data provided by the central unit or the UE may be transmitted to the UE or the central unit via the distributed unit, for transmitting data through the interface between the central unit and the distributed unit and the interface between the distributed unit and the UE, there is a need to propose a method capable of carrying the data and an apparatus supporting the method. In the present specification, the central unit may be referred to as a CU, and the distributed unit may be referred to as a DU. In the present specification, the base station supporting the CU and the DU may be referred to as a gNB. In the present specification, an interface between the CU and the DU may be represented by Xu or F1, and an interface between the DU and the UE may be represented by Uu.

Figure 10:
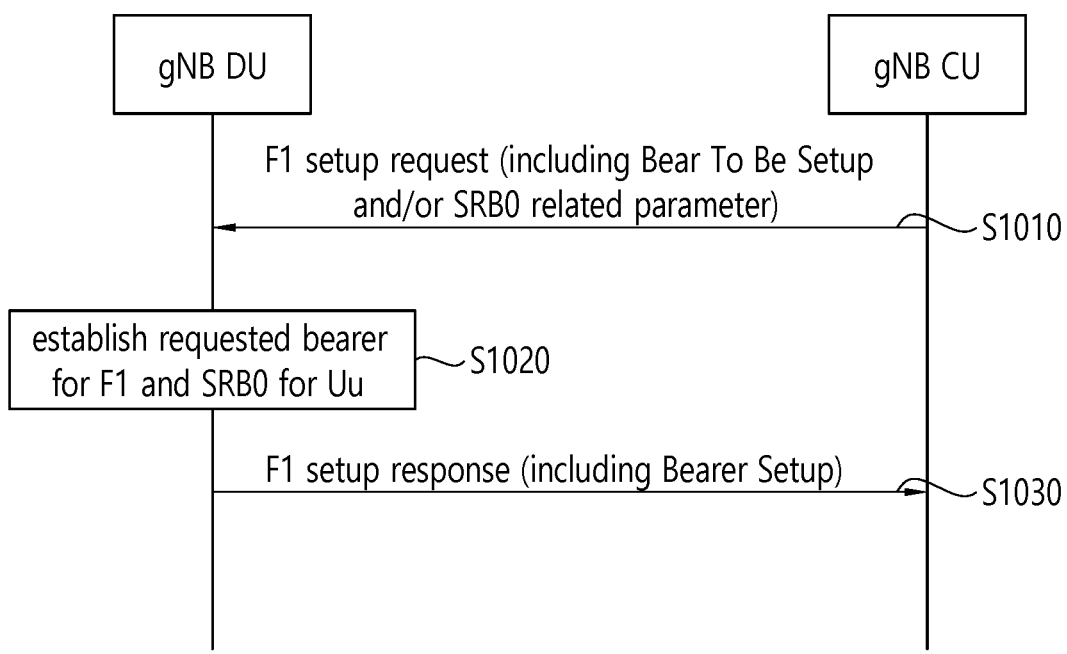
FIG. 10 shows a procedure of establishing a bearer through an F1 setup procedure according to an embodiment of the present invention.

FIG. 10 shows a procedure of establishing a bearer through an F1 setup procedure according to an embodiment of the present invention.

A DU of a gNB may allocate a resource on an interface between a CU and the DU for one or more bearers for transmission of an RRC message when the interface between the CU of the gNB and the DU of the gNB is set up. In addition, the DU of the gNB may allocate a resource on an interface between the DU and a UE for one or more bearers for transmission of the RRC message. The RRC message may be a message related to RRC connection establishment with the gNB when the UE is in RRC_IDLE state. Alternatively, the RRC message may be a message related to paging or system information.

Referring to FIG. 10, in step S1010, the gNB CU may transmit an F1 setup request message to the gNB DU. The F1 setup request message may include Bearer to Be Setup to request for resource allocation on F1 for an SRB0 bearer. The Bearer To Be Setup may include at least any one of a bearer ID, a bearer level QoS parameter, a TNL address for the gNB CU, and a UL TEID for the gNB CU.

For a bearer used for paging and system information broadcasting, the Bearer to Be Setup may not include the UL TEID for the gNB CU. Whether it is SRB0, paging, and system information broadcasting may be differentiated by the bearer ID. In addition, the F1 setup request message may include an SRB0 related parameter for allowing the gNB DU to establish SRB0 for Uu. For example, the SRB0 related parameter may be at least any one of an RLC configuration, a MAC configuration, a logical channel configuration, and a priority.

In step S1020, upon receiving the request message from the gNB CU, for an SRB0 bearer, the gNB DU may establish the SRB0 bearer and allocate a required resource on F1 for the SRB0 bearer requested to be established. For a bearer used for paging and system information broadcasting, the gNB DU may establish each bearer for CU to DU direction only and allocate the required resource on F1 for each bearer. In addition, the gNB DU may establish SRB0 for Uu based on an SRB0 related parameter. The SRB0 related parameter may be a parameter received in step S1010. Alternatively, the SRB0 related parameter may be a parameter which is pre-stored in the gNB DU.

In step S1030, the gNB DU may respond with an F1 setup response message to the gNB CU. The F1 setup response message may include a bearer setup. The bearer setup may include at least any one of a bearer ID, a TNL address for the gNB DU, and a DL TEID for the gNB DU.

Figure 11:
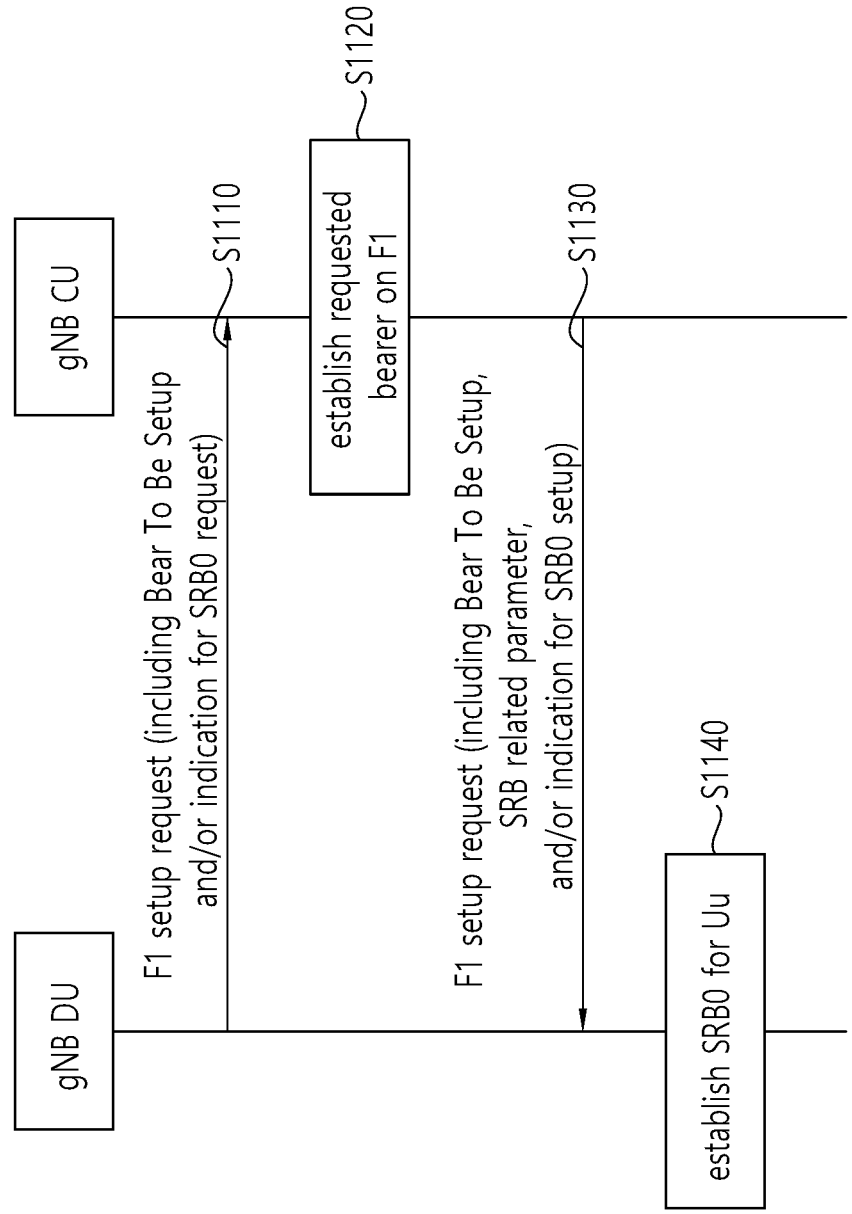
FIG. 11 shows a procedure of establishing a bearer through an F1 setup procedure according to an embodiment of the present invention.

FIG. 11 shows a procedure of establishing a bearer through an F1 setup procedure according to an embodiment of the present invention.

A CU of a gNB may allocate a resource on an interface between a CU and the DU for one or more bearers for transmission of an RRC message when the interface between the CU of the gNB and the DU of the gNB is set up. In addition, the DU of the gNB may allocate a resource on an interface between the DU and a UE for one or more bearers for transmission of the RRC message. The RRC message may be a message related to RRC connection establishment with the gNB when the UE is in RRC_IDLE state. Alternatively, the RRC message may be a message related to paging or system information.

Referring to FIG. 11, in step S1110, the gNB DU may transmit an F1 setup request message to the gNB CU. The F1 setup request message may include Bearer to Be Setup to request for resource allocation on F1 for an SRB0 bearer. The Bearer To Be Setup may include at least any one of a bearer ID, a bearer level QoS parameter, a TNL address for the gNB DU, and a DL TEID for the gNB DU.

Whether it is SRB0, paging, and system information broadcasting may be differentiated by the bearer ID. In addition, the F1 setup request message may include an indication for an SRB0 request. The indication for the SRB0 request may be used to request the gNB CU to transmit an SRB0 related parameter for establishing an SRB0 for Uu. The indication for the SRB0 request may be included in the F1 setup request message when the gNB DU does not have the SRB0 related parameter.

In step S1120, upon receiving the request message from the gNB DU, for an SRB0 bearer, the gNB CU may establish the SRB0 bearer and allocate a required resource on F1 for the SRB0 bearer requested to be established. For a bearer used for paging and system information broadcasting, the gNB CU may establish each bearer for CU to DU direction only and allocate the required resource on F1 for each bearer.

In step S1130, the gNB CU may respond with an F1 setup response message to the gNB DU. The F1 setup response message may include a bearer setup. The bearer setup may include at least any one of a bearer ID, a TNL address for the gNB CU, and a UL TEID for the gNB CU. For a bearer used for paging and system information broadcasting, the Bearer Setup may not include the UL TEID for the gNB CU.

In addition, the F1 setup response message may include an SRB0 related parameter. For example, the SRB0 related parameter may be at least any one of an RLC configuration, a MAC configuration, a logical channel configuration, and a priority. Preferably, when the gNB CU receives the indication for the SRB0 request in step S1110, the SRB0 related parameter may be included in the F1 setup response message.

In addition, the F1 setup response message may include the indication for SRB0 setup. The indication for SRB0 setup may be included in the F1 setup response message, when the gNB CU does not receive the indication for the SRB0 request in Step S1110 because the gNB DU has parameters for establishing SRB0 in the Uu interface in advance.

In step S1140, when the gNB DU receives the F1 setup response message from the gNB CU, the gNB DU may establish an SRB0 for Uu on the basis of the SRB0 related parameter. The SRB0 related parameter may be a parameter received in step S1130. Alternatively, when the F1 setup response message includes the indication for SRB0 setup, the SRB0 related parameter may be a parameter which is pre-stored in the gNB DU.

Figure 12:
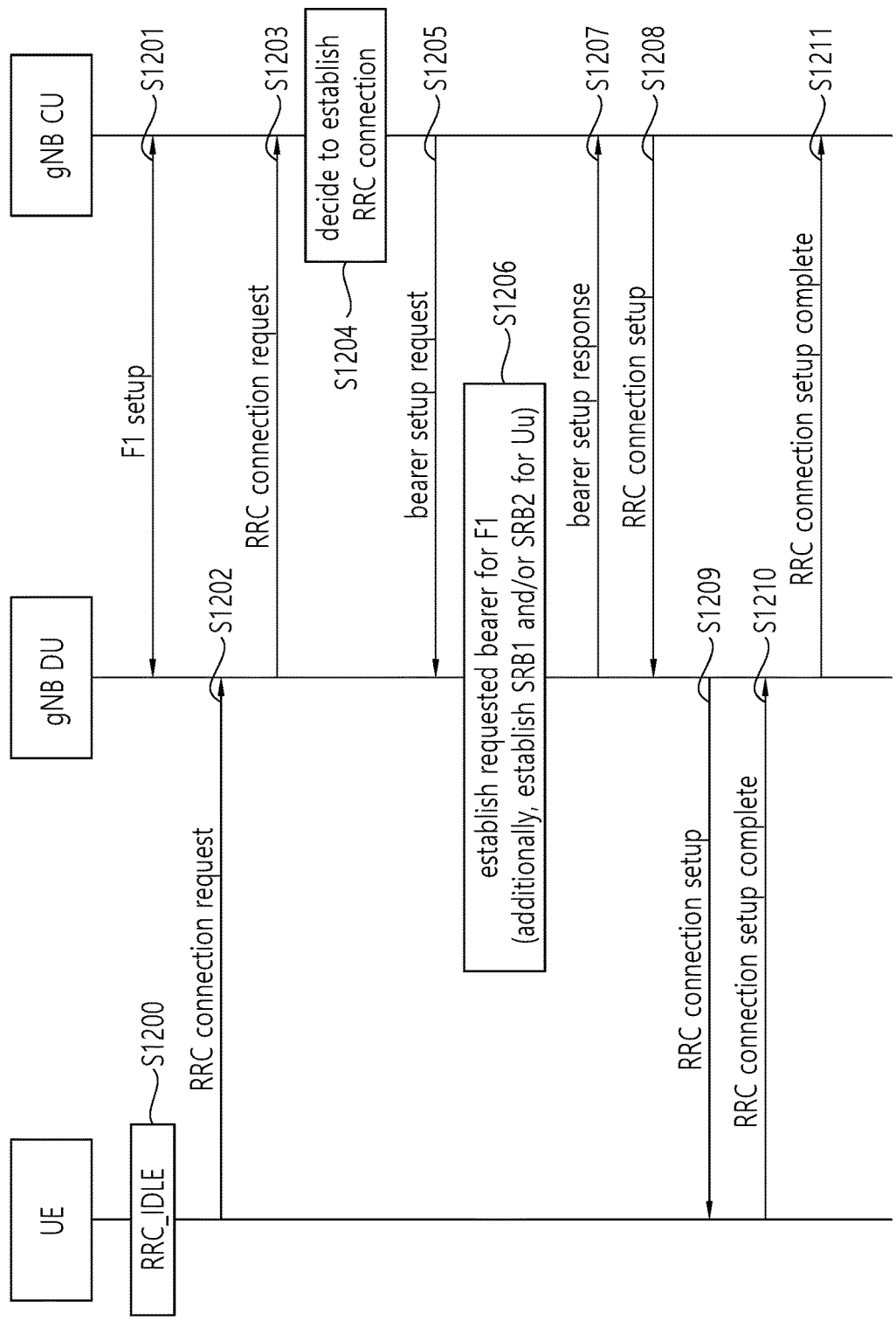
FIG. 12 shows a procedure of establishing a bearer in an RRC connection establishment procedure according to an embodiment of the present invention.

FIG. 12 shows a procedure of establishing a bearer in an RRC connection establishment procedure according to an embodiment of the present invention.

A gNB DU may allocate a resource on F1 for an SRB1 bearer to be used to transmit an RRC message. In addition, the gNB DU may allocate a resource on Uu for an SRB1 bearer and/or SRB2 bearer to be used to transmit/receive an RRC message. The resource may be allocated after a gNB CU accepts the RRC connection establishment requested by a UE in an RRC_IDLE state.

In step S1200, the UE may be in the RRC_IDLE state.

In step S1201, an F1 setup procedure may be performed between the gNB CU and the gNB DU.

In step S1202, the UE may transmit an RRC connection request message to the gNB DU in order to request for the RRC connection establishment.

In step S1203, when the gNB DU receives the RRC connection request message from the UE, the gNB DU may forward the received RRC connection request message to the gNB CU. The RRC connection request message may be forwarded through the SRB0 bearer created in the F1 setup procedure.

In step S1204, when the gNB CU receives the RRC connection request message from the gNB DU, the gNB CU may decide whether to accept the RRC connection establishment of the UE.

In step S1205, when the gNB CU decides to accept the RRC connection establishment of the UE, the gNB CU may transmit a bearer setup request message to the gNB DU. The bearer setup request message may be a message which requests for resource allocation on F1 for the SRB1 bearer to transmit the RRC connection setup message. Alternatively, the bearer setup request message may be a message which requests for resource allocation on Uu for the SRB1 bearer and/or the SRB2 bearer to transmit/receive an RRC message (e.g., an RRC connection setup complete message). The bearer setup request message may include at least any one of an SRB ID, a bearer level QoS parameter, a TNL address for the gNB CU, a UL TEID for the gNB CU, an RLC configuration, and a logical channel configuration.

In step S1206, when the gNB DU receives the bearer setup request message from the gNB CU, the gNB DU may establish the SRB1 bearer, and may allocate a required resource on F1 for the SRB1 bearer requested to be established. In addition, the gNB DU may establish the SRB1 bearer and/or SRB2 bearer for Uu, and may allocate a required resource on Uu for the SRB1 bearer and/or SRB2 bearer requested to be established.

In step S1207, the gNB DU may respond with a bearer setup response message to the gNB DU to indicate that the requested bearer is established. For example, the gNB DU may respond with a bearer setup response message to the gNB CU to indicate that the requested bearer is established for F1. For example, the gNB DU may respond with a bearer setup response message to the gNB CU to indicate that the requested SRB1 bearer and/or SRB2 bearer are established for Uu. The bearer setup response message may include at least any one of an SRB ID, a TNL address for the gNB DU, and a DL TEID for the gNB DU.

In step S1208, when the gNB CU receives the bearer setup response message from the gNB DU, the gNB CU may transmit the RRC connection setup message to the gNB DU. The RRC connection setup message may be transmitted through the established SRB1 bearer.

In step S1209, when the gNB DU receives the RRC connection setup message from the gNB CU, the gNB DU may forward the RRC connection setup message to the UE.

In step S1210, the gNB may transmit the RRC connection setup complete message to the gNB DU.

In step S1211, when the gNB DU receives the RRC connection setup complete message from the UE, the gNB DU may forward the RRC connection setup complete message to the gNB CU. The RRC connection setup complete message may be transmitted through the SRB1 bearer.

Figure 13:
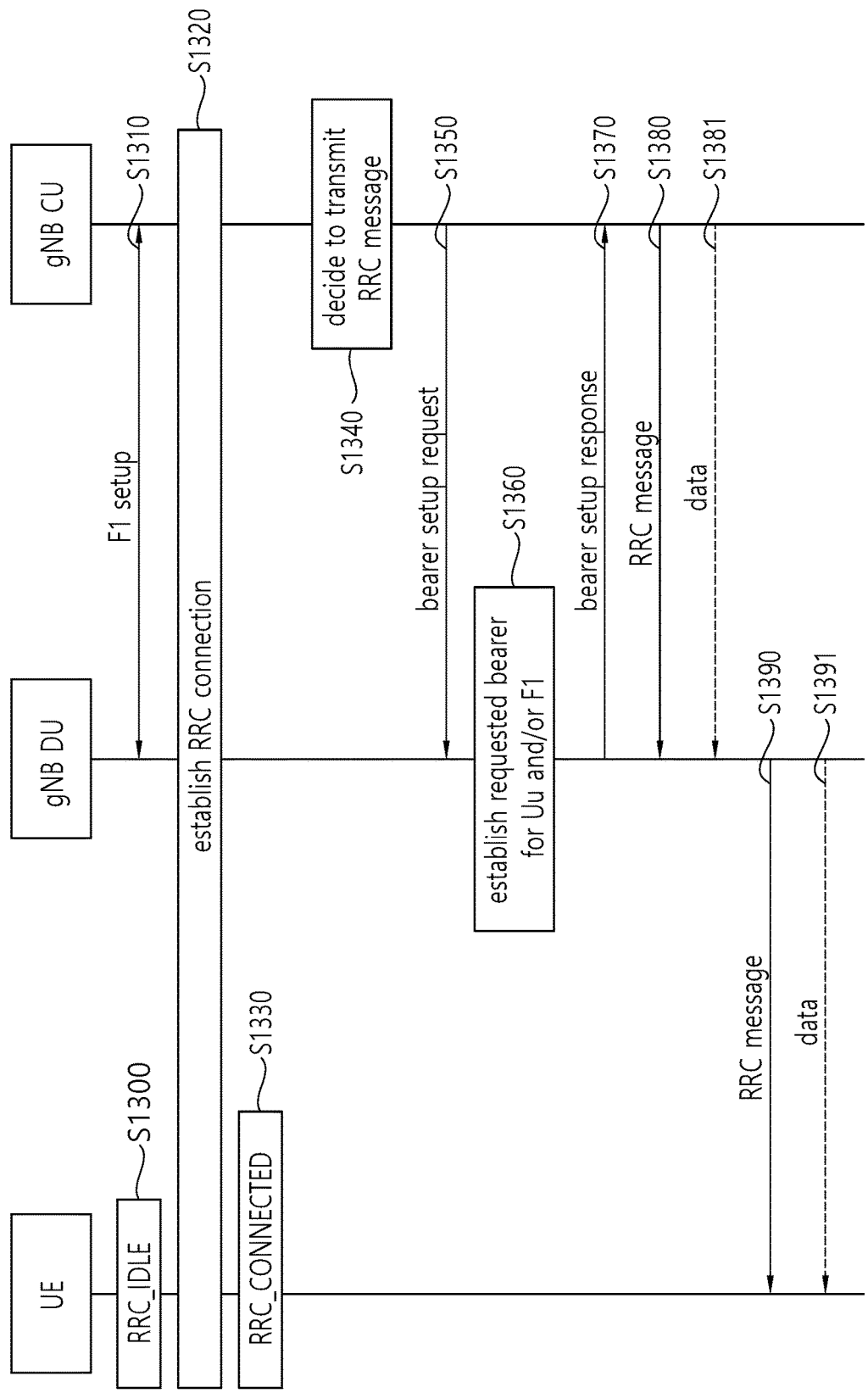
FIG. 13 shows a procedure of establishing a bearer after an RRC connection establishment procedure is complete according to an embodiment of the present invention.

FIG. 13 shows a procedure of establishing a bearer after an RRC connection establishment procedure is complete according to an embodiment of the present invention.

A gNB DU may allocate a resource on F1 for an SRB2 bearer to be used to transmit an RRC message. In addition, the gNB DU may allocate a resource on Uu for the SRB2 bearer to be used to transmit the RRC message. The resource may be allocated after the gNB CU completes the RRC connection establishment requested by a UE in an RRC_IDLE state. An embodiment of FIG. 13 may be used to allocate a resource on F1 for a DRB bearer. In addition, the embodiment of FIG. 13 may be used to allocate a resource on Uu for the DRB bearer.

In step S1300, the UE may be in the RRC_IDLE state.

In step S1310, an F1 setup procedure may be performed between the gNB CU and the gNB DU.

In step S1320, the RRC connection establishment may be performed between the gNB CU and the UE through the gNB DU.

In step S1330, the UE may enter an RRC_CONNECTED state.

In step s1340, the gNB CU may decide to transmit the RRC message by using the SRB2 bearer. Alternatively, the gNB CU may decide to set up the DRB bearer for transmitting data to the UE.

In step S1350, the gNB CU may transmit a bearer setup request message to the gNB DU. The bearer setup request message may be a message which requests for resource allocation on F1 for the SRB2 bearer to transmit/receive the RRC message. Alternatively, the bearer setup request message may be a message which requests for resource allocation on Uu for the SRB2 bearer to transmit/receive the RRC message. Alternatively, the bearer setup request message may be a message which requests for resource allocation on F1 for a DRB bearer to transmit/receive data. Alternatively, the bearer setup request message may be a message which requests for resource allocation on Uu for the DRB bearer to transmit/receive data.

If the bearer setup request message is the message which requests for resource allocation for the SRB2 bearer, the bearer setup request message may include at least any one of an SRB ID, a bearer level QoS parameter, a TNL address for the gNB CU, a UL TEID for the gNB CU, an RLC configuration, and a logical channel configuration.

If the bearer setup request message is the message which requests for resource allocation for the DRB bearer, the bearer setup request message may include at least any one of an E-RAB ID, a DRB ID, a bearer level QoS parameter, a TNL address for the gNB CU, a UL TEID for the gNB CU, a PDCP configuration, an RLC configuration, a logical channel ID, and a logical channel configuration.

In step S1360, when the gNB DU receives the bearer setup request message from the gNB CU and the bearer setup request message includes a request for the SRB2 bearer, the gNB DU may establish the SRB2 bearer, and may allocate a required resource on F1 for the SRB2 bearer requested to be established. In addition, the gNB DU may establish the SRB2 bearer, and may allocate a required resource on Uu for the SRB2 bearer requested to be established.

If the bearer setup request message includes the request for the DRB bearer, the gNB DU may establish the DRB bearer, and may allocate a required resource on F1 for the DRB bearer requested to be established. In addition, the gNB DU may establish the DRB bearer, and may allocate a required resource on Uu for the DRB bearer requested to be established.

In step S1370, the gNB DU may respond with a bearer setup response message to the gNB CU to indicate that the requested bearer is established. For example, the gNB DU may respond with a bearer setup response message to the gNB CU to indicate that the requested SRB2 bearer is established for F1 and/or Uu. For example, the gNB DU may respond with a bearer setup response message to the gNB CU to indicate that the requested DRB bearer is established for F1 and/or Uu.

In case of the SRB2 bearer, the bearer setup response message may include at least any one of an SRB ID, a TNL address for the gNB DU, and a DL TEID for the gNB DU.

In case of the DRB bearer, the bearer setup response message may include at least any one of an E-RAB ID, a DRB ID, a TNL address for the gNB DU, and a DL TEID for the gNB DU.

In step S1380, in case of the SRB2 bearer, when the gNB CU receives the bearer setup response message from the gNB DU, the gNB CU may transmit the RRC message to the gNB DU. The RRC message may be transmitted through the established SRB2 bearer. In step S1381, in case of the DRB bearer, when the gNB CU receives the bearer setup response message from the gNB DU, the gNB CU may transmit data to the gNB DU. The data may be transmitted through the established DRB bearer.

In step S1390, when the gNB DU receives an RRC message from the gNB CU, the gNB DU may forward the received RRC message to the UE. In step S1391, when the gNB DU receives data from the gNB CU, the gNB DU may forward the received data to the UE.

Figure 14:
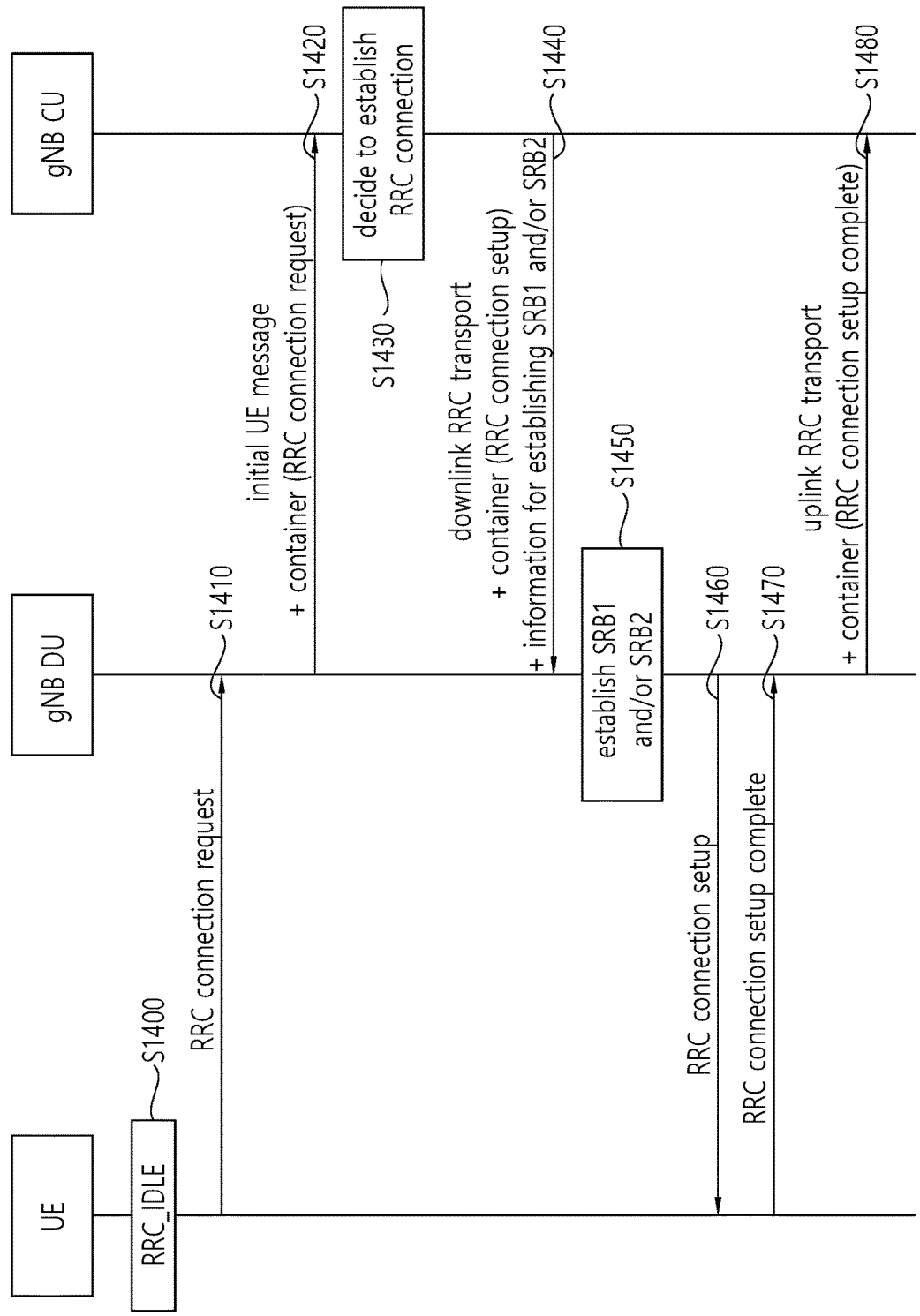
FIG. 14 shows a procedure of establishing a bearer in an RRC connection establishment procedure according to an embodiment of the present invention.

FIG. 14 shows a procedure of establishing a bearer in an RRC connection establishment procedure according to an embodiment of the present invention.

A gNB CU may provide a gNB DU with information for establishing SRB1 and/or SRB2 between the gNB DU and a UE. The information may be provided by the gNB CU to the gNB DU to receive an RRC message. For example, the RRC message may be an RRC connection setup complete message. The information may be provided through an F1-AP (application protocol). The information may be provided when the gNB CU establishes an RRC connection with a UE in an RRC_IDLE state. As described above, F1 may mean an interface between the CU and the DU.

Referring to FIG. 14, in step S1400, the UE may be in the RRC_IDLE state.

In step S1410, the UE may transmit an RRC connection request message to the gNB DU in order to request for the RRC connection establishment.

In step S1420, when the gNB DU receives an RRC connection request message from the UE, the gNB DU may transmit an initial UE message or a new message to the gNB CU. The initial UE message or the new message may include a container which piggybacks the RRC connection request message.

In step S1430, when the gNB CU receives the initial UE message or the new message from the gNB DU, the gNB CU may decide whether to accept the RRC connection establishment of the UE.

In step S1440, when the gNB CU decides to accept the RRC connection establishment of the UE, the gNB CU may transmit a downlink RRC transport message or a new message to the gNB DU. The downlink RRC transport message or the new message may be a message for forwarding the RRC connection setup message piggybacked in the container by the gNB CU to the gNB DU. The downlink RRC transport message or the new message may include information for establishing SRB1 and/or SRB2 between the gNB DU and the UE to receive the RRC message. The information may be at least any one of an SRB ID, a bearer level QoS parameter, an RLC configuration, and a logical channel configuration.

In step S1450, when the gNB DU receives the downlink RRC transport message or the new message from the gNB CU, on the basis of the received information, the gNB DU may establish an SRB1 and/or SRB2 bearer, and may allocate a required resource on a radio interface for the SRB1 and/or SRB2 bearer requested to be established.

In step S1460, the gNB DU may transmit the RRC connection setup message to the UE via the SRB0 bearer.

In step S1470, the UE may transmit the RRC connection setup complete message to the gNB DU via the SRB1 bearer.

In step S1480, when the gNB DU receives the RRC connection setup complete message from the UE, the gNB DU may transmit an uplink RRC transport message or a new message to the gNB CU. The uplink RRC transport message or the new message may include a container which piggybacks the RRC connection setup complete message.

Figure 15:
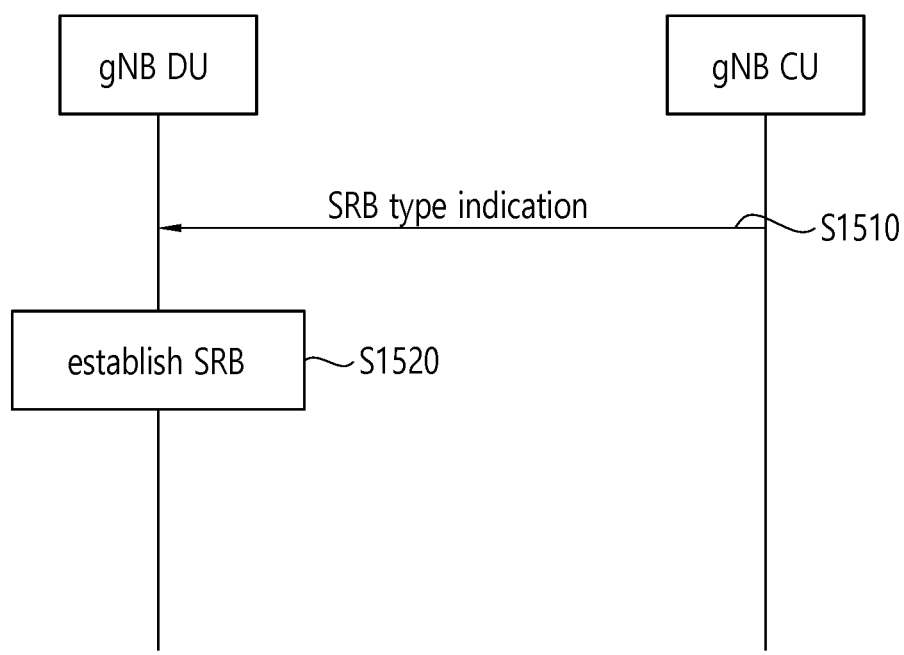
FIG. 15 shows a procedure of establishing an SRB according to an embodiment of the present invention.

FIG. 15 shows a procedure of establishing an SRB according to an embodiment of the present invention.

Referring to FIG. 15, in step S1510, a gNB CU may transmit an SRB type indication to a gNB DU. The SRB type indication may be an SRB ID. The SRB ID may indicate at least any one of SRB0, SRB1, SRB2, and SRB3. Therefore, upon receiving the SRB ID from the gNB CU, the gNB DU may identify which type of bearer is to be established among the SRB0, the SRB1, the SRB2, and the SRB3 on the basis of the SRB ID. The SRB ID may be transmitted through an interface between the gNB CU and the gNB DU. The interface may be a control plane interface (i.e., F1-C).

In step S1520, the gNB DU may establish the bearer identified by the SRB ID.

Figure 16:
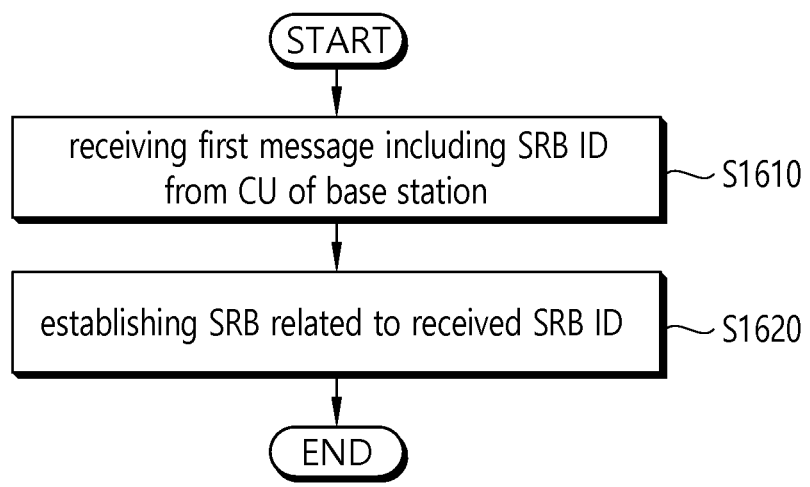
FIG. 16 shows a method of establishing a bearer by a DU of a base station according to an embodiment of the present invention.

FIG. 16 shows a method of establishing a bearer by a DU of a base station according to an embodiment of the present invention.

Referring to FIG. 16, in step S1610, the DU of the base station may receive a first message including a signaling radio bearer (SRB) identity (ID) from a central unit (CU) of the base station. The SRB ID may indicate at least any one of the SRB0, the SRB1, the SRB2, and the SRB3.

The first message may include a bearer level QoS parameter, a radio link control (RLC) configuration, and a logical channel configuration which are used to establish the SRB.

The first message may be received through a control plane interface between the CU of the base station and the DU of the base station. The control plane interface may be an F1-C interface.

The first message further may include a container which piggybacks a radio resource control (RRC) message.

The first message may include a data radio bearer (DRB) ID. In addition, the DU of the base station may establish a DRB related to the DRB ID if the DRB ID is included in the first message.

In step S1620, the DU of the base station may establish an SRB related to the received SRB ID. The SRB may be at least any one of SRB0, SRB1, SRB2, and SRB3.

In addition, after establishing the SRB, the DU of the base station may transmit a second message indicating the establishment of the SRB to the CU of the base station. The second message may include an SRB ID related to the established SRB.

The CU of the base station may include an RRC layer and a packet data convergence protocol (PDCP) layer, and the DU of the base station including a radio link control (RLC) layer, a media access control (MAC) layer, a physical (PHY) layer, and a radio frequency (RF).

The base station may be a 5G RAN, a gNB, or a new radio (NR) base station (BS).

According to an embodiment of the present invention, the RRC message may be forwarded through an interface between the CU and the DU and an interface between the DU and the UE. Further, data provided by the CU or the UE may be forwarded through the interface between the CU and the DU and the interface between the DU and the UE.

Figure 17:
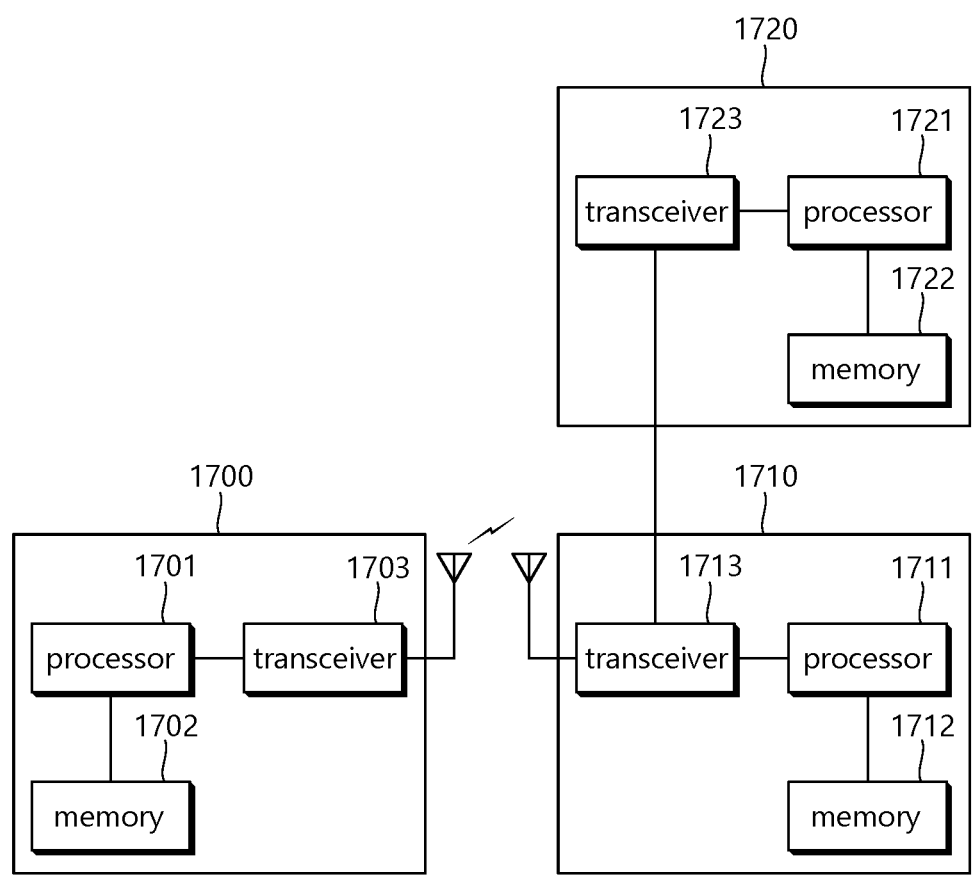
FIG. 17 is a block diagram illustrating a wireless communication system according to the embodiment of the present invention.

FIG. 17 is a block diagram illustrating a wireless communication system according to the embodiment of the present invention.

A UE 1700 includes a processor 1701, a memory 1702 and a transceiver 1703. The memory 1702 is connected to the processor 1701, and stores various information for driving the processor 1701. The transceiver 1703 is connected to the processor 1701, and transmits and/or receives radio signals. The processor 1701 implements proposed functions, processes and/or methods. In the above embodiment, an operation of the user equipment may be implemented by the processor 1701.

A DU of a base station 1710 includes a processor 1711, a memory 1712 and a transceiver 1713. The memory 1712 is connected to the processor 1711, and stores various information for driving the processor 1711. The transceiver 1713 is connected to the processor 1711, and transmits and/or receives radio signals. The processor 1711 implements proposed functions, processes and/or methods. In the above embodiment, an operation of the DU may be implemented by the processor 1711.

A CU of the base station 1720 includes a processor 1712, a memory 1722 and a transceiver 1723. The memory 1722 is connected to the processor 1721, and stores various information for driving the processor 1721. The transceiver 1723 is connected to the processor 1721, and transmits and/or receives radio signals. The processor 1721 implements proposed functions, processes and/or methods. In the above embodiment, an operation of the CU may be implemented by the processor 1721.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of establishing a bearer by a distributed unit (DU) of a base station in a wireless communication system, the method comprising:
   receiving, from a central unit (CU) of the base station, a first message comprising a signaling radio bearer (SRB) identity (ID) and a container which piggybacks a radio resource control (RRC) message; and
   establishing an SRB related to the received SRB ID.

2. The method of claim 1, wherein the SRB is at least any one of SRB0, SRB1, SRB2, and SRB3.

3. The method of claim 2, wherein the SRB ID indicates at least any one of the SRB0, the SRB1, the SRB2, and the SRB3.

4. The method of claim 1, wherein the first message comprises a bearer level quality of service (QoS) parameter, a radio link control (RLC) configuration, and a logical channel configuration which are used to establish the SRB.

5. The method of claim 1, further comprising:
   transmitting, to the CU of the base station, a second message indicating the establishment of the SRB, after establishing the SRB.

6. The method of claim 5, wherein the second message comprises an SRB ID related to the established SRB.

7. The method of claim 1, wherein the first message is received through a control plane interface between the CU of the base station and the DU of the base station.

8. The method of claim 7, wherein the control plane interface is an F1-C interface.

9. The method of claim 1, wherein the CU of the base station comprises an RRC layer and a packet data convergence protocol (PDCP) layer, and the DU of the base station comprises a radio link control (RLC) layer, a media access control (MAC) layer, a physical (PHY) layer, and a radio frequency (RF).

10. The method of claim 1, wherein the first message comprises a data radio bearer (DRB) ID.

11. The method of claim 10, further comprising establishing a DRB related to the DRB ID based on the DRB ID being included in the first message.

12. The method of claim 1, wherein the base station is a 5G RAN, a gNB, or a new radio (NR) base station (BS).

13. A distributed unit (DU) of a base station configured to establish a bearer in a wireless communication system, the DU comprising:
   a memory; a transceiver, and a processor connected to the memory and the transceiver, wherein the processor is configured to:
   control the transceiver to receive, from a central unit (CU) of the base station, a first message comprising a signaling radio bearer (SRB) identity (ID) and a container which piggybacks a radio resource control (RRC) message; and
   establish an SRB related to the received SRB ID.

14. The DU of claim 13, wherein the SRB is at least any one of SRB0, SRB1, SRB2, and SRB3.

* * * * *